Patented Apr. 2, 1946

2,397,903

UNITED STATES PATENT OFFICE 2,397,903

METHYLENE-BIS-2 HYDROXY-3 NAPHTHOATES

Bruno Puetzer, New Rochelle, N. Y., assignor to Vick Chemical Company, New York, N. Y., a corporation of Delaware No Drawing. Application September 19, 1944, Serial No. 554,856

4 Claims. (Cl. 260—251)

This invention relates to water-insoluble derivatives of vitamins $B_1$ (thiamine) and $B_6$ (pyridoxine). The new compounds are very stable, even in the presence of water, and are particularly valuable for use in polyvitamin or vitamin B complex tablets, where decomposition of the vitamin $B_1$ factor has been commonly encountered. The new compounds readily hydrolyze in the presence of dilute acid or alkali, and therefore, on ingestion, form the hydrochlorides in the stomach. The biological activity of the new compounds is that of the vitamin B factor content, unimpaired.

The compounds of the invention are the salts of thiamine and pyridoxine with methylene-bis-2-hydroxy-3-naphthoic acid, of the formula:

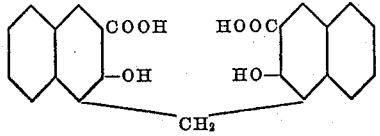

They are readily prepared by reaction of the disodium salt of this acid with the hydrochlorides of thiamine and pyridoxine in aqueous solution at ordinary temperatures. Yields are almost quantitative.

The new compounds are substantially insoluble in water, are stable even in the presence of water, are soluble in dilute alcohol, acetone and other organic solvents, and hydrolyze in dilute acid or alkali. On heating, they decompose. They may be crystallized from solution, and, in crystalline form, are almost white.

The invention will be further illustrated by the following examples:

*Example I.*—To a solution of 17 parts of thiamine hydrochloride in 200 parts of water was added, with agitation and at room temperature, a solution of 25 parts of the di-sodium salt of methylene - bis - 2 - hydroxy - 3 - naphthoic acid (88% pure). A cream-colored precipitate, which on standing partly crystallized, formed. After recrystallization from 70% alcohol, a product which decomposed at 180–185° C. was obtained. The yield was almost theoretical. The product had a biological potency equivalent to the thiamine hydrochloride originally taken. It has the probable formula:

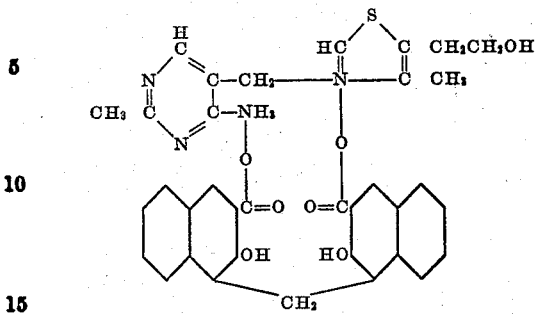

and may be termed thiamine-methylene-bis-2-hydroxy-3-naphthoate.

*Example II.*—To a solution of 41.1 parts of pyridoxine hydrochloride in 500 parts of water was added, with agitation and at room temperature, 43.2 parts of the di-sodium salt of methylene-bis-2-hydroxy-3-naphthoic acid. An amorphous precipitate, which crystallized on standing, formed. It was recrystallized from acetone. On heating it decomposed. It was a little more soluble in water than the product of Ex. I, was soluble in aqueous alcohol and acetone. It had a biological potency equivalent to the pyridoxine hydrochloride taken. It has the probable formula:

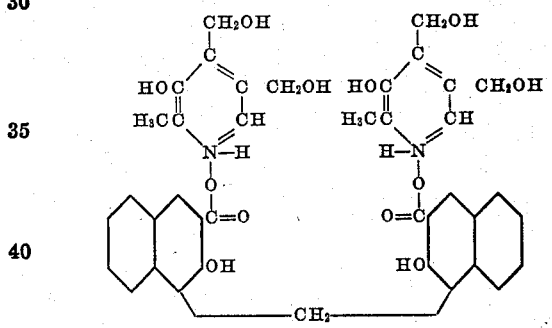

and may be termed dipyridoxine methylene-bis-2-hydroxy-3-naphthoate.

The present invention also provides a convenient and simple process for the separation of the two water soluble vitamin B factors, thiamine and pyridoxine, from aqueous solutions, for example, of their water soluble salts. All that is required is the addition of an equivalent quantity of the sodium or other soluble salt of the methylene-bis-2-hydroxy-3-naphthoic acid, under substantially neutral conditions, whereupon the compounds described in Examples I and II separate.

I claim:

1. A methylene-bis-2-hydroxy-3-naphthoic acid salt of a compound of the class consisting of thiamine and pyridoxine.

2. Thiamine-methylene-bis-2-hydroxy-3-naphthoate.

3. Dipyridoxine methylene-bis-2-hydroxy-3-naphthoate.

4. The process of forming a salt of a compound of the class consisting of thiamine and pyridoxine which comprises adding to an aqueous solution of said compound a water soluble salt of methylene-2-hydroxy-3-naphthoic acid.

BRUNO PUETZER.

DISCLAIMER 2,397,903.—*Bruno Puetzer*, New Rochelle, N. Y. METHYLENE-BIS-2 HYDROXY-3 NAPHTHOATES. Patent dated Apr. 2, 1946. Disclaimer filed Aug. 22, 1947, by the assignee, *Vick Chemical Company*.

Hereby enters this disclaimer to that part of claims 1 and 4 which is in the following words: "a compound of the class consisting of thiamine and"; and to all of claim 2.

[*Official Gazette October 7, 1947.*]